(12) United States Patent
Havens et al.

(10) Patent No.: US 8,033,237 B2
(45) Date of Patent: Oct. 11, 2011

(54) ENVIRONMENTAL CONDITION CUMULATIVE TRACKING INTEGRATION SENSOR USING SHAPE MEMORY POLYMER

(75) Inventors: David Ernest Havens, Bellbrook, OH (US); Patrick J. Hood, Bellbrrok, OH (US); Teresa E. Havens, Bellbrook, OH (US); Joel J. Everhart, Beavercreek, OH (US); Aaron M. Schneider, Pittsburgh, PA (US)

(73) Assignee: Cornerstone Research Group, Inc., Dayton, OH (US)

( * ) Notice: Subject to any disclaimer, the term of this patent is extended or adjusted under 35 U.S.C. 154(b) by 951 days.

(21) Appl. No.: 11/993,154

(22) PCT Filed: Jun. 21, 2006

(86) PCT No.: PCT/US2006/024089
§ 371 (c)(1),
(2), (4) Date: Dec. 19, 2007

(87) PCT Pub. No.: WO2007/002161
PCT Pub. Date: Jan. 4, 2007

(65) Prior Publication Data
US 2010/0218716 A1     Sep. 2, 2010

Related U.S. Application Data

(60) Provisional application No. 60/692,458, filed on Jun. 21, 2005.

(51) Int. Cl.
*G01K 1/02* (2006.01)
(52) U.S. Cl. ............... 116/216; 116/200; 374/52
(58) Field of Classification Search .......... 116/200–201, 116/216; 374/195, 205, 52, 55, 155; 606/28, 606/219
See application file for complete search history.

(56) References Cited

U.S. PATENT DOCUMENTS

| | | | |
|---|---|---|---|
| 2,966,261 A * | 12/1960 | Bradbury | 206/306 |
| 3,290,942 A * | 12/1966 | Carbaugh et al. | 374/104 |
| 5,531,180 A | 7/1996 | Bianchini | |
| 5,735,607 A | 4/1998 | Shahinpoor | |
| 5,910,357 A | 6/1999 | Hachisuka et al. | |
| 6,388,043 B1 * | 5/2002 | Langer et al. | 528/80 |
| 6,795,376 B2 | 9/2004 | Quine | |
| 6,848,390 B2 * | 2/2005 | Akers et al. | 116/216 |
| 6,865,516 B1 | 3/2005 | Richardson | |
| 6,950,028 B2 | 9/2005 | Zweig | |
| 6,982,640 B2 | 1/2006 | Lindsay et al. | |
| 7,057,495 B2 | 6/2006 | Debord et al. | |
| 7,275,863 B1 | 10/2007 | Akers et al. | |
| 7,628,116 B2 * | 12/2009 | Browne et al. | 116/216 |
| 2001/0042501 A1 | 11/2001 | Park | |
| 2003/0188677 A1 | 10/2003 | Akers et al. | |
| 2004/0120384 A1 | 6/2004 | Shahinpoor | |
| 2004/0156418 A1 | 8/2004 | Debord et al. | |
| 2004/0210027 A1 | 10/2004 | Hayashi | |
| 2004/0212509 A1 | 10/2004 | Zweig | |
| 2005/0105587 A1 | 5/2005 | Shahinpoor | |
| 2005/0248455 A1 | 11/2005 | Pope et al. | |
| 2006/0061454 A1 | 3/2006 | Debord et al. | |
| 2007/0119364 A1 | 5/2007 | Taylor | |

* cited by examiner

*Primary Examiner* — R. A Smith
*Assistant Examiner* — Tania Courson

(57) ABSTRACT

The present invention utilizes the unique shape recovery properties of shape memory materials, especially shape memory polymers, to provide an inexpensive and easily identified method of determining when a product has been exposed to environmental conditions that would make it likely that the product has expired or is unfit for use. By allowing the shape memory material to alter its shape from a deformed shape to a memory shape in response to exposure to environmental conditions while attached to a visual indication device a viewer can easily determine if a product has expired.

24 Claims, 12 Drawing Sheets

ENVIRONMENTAL CONDITION CUMULATIVE TRACKING INTEGRATION SENSOR USING SHAPE MEMORY POLYMER

CROSS-REFERENCE TO RELATED APPLICATIONS

Priority benefit of U.S. Provisional Patent Application Ser. No. 60/692,458 filed Jun. 21, 2005 is claimed.

BACKGROUND OF THE INVENTION

1. Field of the Invention

The present invention relates to various methods and apparatus for detecting environmental conditions around perishable merchandise and visually relating this information in an easily read format as the environmental conditions relate to the fitness for use or spoilage of the merchandise. These embodiments can be used to detect the fitness for use of long shelf-life products such as ammunition, fuel, and other products which can have shelf-lives of up to 30 or more years as well as detecting the likelihood of spoilage in short shelf-life products such as chilled foodstuffs such as meats, vegetables, and other similar frozen foods as well as medicines and other items which have shelf-lives of hours or days if exposed to improper environmental storage conditions.

The monitoring and control of environmental conditions around all products can give them enhanced, but not indefinite shelf-life by controlling the environmental conditions around them such that these environmental conditions decrease the risk of the products becoming defective or spoiled over time. More particularly, health concerns for spoiled food have recently led several governments to suggest or require that all food requiring refrigeration for transport or storage be continually monitored to minimize the risk of spoilage due to exposure to increased temperatures.

One of the dangers involved in food transport is the danger of the growth of bacteria such as *Clostridium Botulinum* which produces botulinum toxins in food. Traditionally it was easy for consumers to tell if food was at a higher risk of being spoiled by its smell, look and feel. However, changes in the smell, look and feel of food are caused principally by exposure to oxygen, ultraviolet light, or both not by the bacteria which can lead to food poisoning. With the advent of modern day packaging and refrigeration most foods are not exposed to a sufficient amount of oxygen or ultraviolet light to make the food consumers buy obviously spoiled with traditional means.

Since most bacteria can grow on food in the absence of oxygen, the only sure method of preventing their growth is to maintain the food at or below a specified temperature, typically at or below between 32-33 degrees Fahrenheit or 0 to 0.5 degrees Celsius. Even a small temperature rise to 34 or 36 degrees or 0.5-2 degrees Celsius, over a few days, can allow *C. Botulinum* bacteria to grow in sufficient numbers to cause food poisoning. By continuously monitoring the environmental temperature around food, the present invention can easily determine the conditions when the food is likely to have become spoiled.

Temperature is not the only environmental factor that can affect the usefulness of products. The Relative Humidity, or the vapor pressure of water in the atmosphere around the product, can expose the product to an excessive amount of water which may degrade certain products including but not limited to potato chips, crackers, bread, pasta, vegetables, meats, and other food products.

The present invention can be used to monitor the humidity and temperature of the environment around a product which can both affect the usefulness and shelf-life of other products such as ammunition, fuel, and other products. Typically ammunition has a shelf-life of 20 years or more. However, this shelf-life can be lowered by exposure to excessive temperatures as well as humidity. Use of the present invention will provide a rapid, visual indication of the fitness for use of ammunition that has been in storage for many years.

Prolonged exposure to high heat and humidity accelerates the aging process and reduces the service life of many products, both military and commercial. Administratively tracking environmental exposures is an impossible task for items with long life cycles. Tracking ordinance offers a significant challenge, since it may be loaded or transferred in a multitude of environments and ultimately stored for many years on land or at sea. Currently, as ordinance is shipped, transferred, and mixed with various stock, its relative freshness can only be determined by age when, in fact, age only plays a minor role in the overall freshness. Application of sensing devices would allow the freshest ammunition/ordinance to be reserved for the most critical situations.

The present invention provide a means to track the relative fitness for use of a wide variety of class of goods without the use of any electronic means, although it should be apparent to those skilled in the art that electronic means can be incorporated into the present invention for use in an inventory tracking system as described below.

2. Background Art

Generally a temperature sensitive product does not decay or become spoiled as a result of exposure to a given temperature. Instead, the product spoils due to the amount of heat imparted to it as a result of a temperature difference over time. The present invention is distinguished over the prior art by its use of shape memory material, and specifically shape memory polymers, to cumulatively track a products exposure to various environmental conditions over time, indicating the degree of deterioration based on this exposure, and doing so cheaply, accurately, and without the aid of any electrical device.

First introduced in the United States in 1984, Shape Memory Polymers (hereinafter "SMPs") are polymers whose qualities have been altered to give them dynamic shape "memory" properties. SMPs are polymers that derive their name from their inherent ability to return to their original "memorized" shape after undergoing a shape deformation. An article in the Journal of Food Protection (Vol. 61. No. 9. 1998. Pages 1154-1160) entitled "Conservative Prediction of Time to *Clostridium Botulinum* Toxin Formation for Use with Time-Temperature Indicators to Ensure the Safety of Foods" authored by Guy Skinner and John Larkin outlines the need for a sensor technology such as the one CRG is currently developing. Specifically, this paper outlines an entire market for CRG's technology. This market is commonly known as the Larkin market.

In summary, the Larkin market involves foods that are packaged in varying forms of reduced oxygen packaging (hereinafter "ROP"). ROP creates an environment that significantly reduces the growth of anaerobic spoilage organisms. This enables longer shelf life for fresh foods and increases the market range for certain fresh foods that are geographically disadvantaged such as seafood. This market considers foods that are not frozen to be fresh foods. Fresh foods are considered premium and consumers are willing to pay a premium price; therefore, the margins associated with this fresh food segment of the consumer foods industry are much higher.

There is a fine line between frozen food temperatures and slightly warmer temperatures that enable the growth of deadly toxins as described in Larkin's article. Lethal levels of botulinum toxins can result if fresh foods are subjected to temperatures above 3.3° C. for relatively long periods of time. Moreover, if the fresh foods have been packaged in ROP is becomes difficult for the average consumer to detect because the lack of oxygen, which is not necessary for the bacteria growth, will mask some of the common visual spoilage signs such as odor, slime, and texture.

Because foods such as seafood may be packaged and repackaged several times between the dock and the supermarket, it becomes difficult to determine if the seafood is always fresh and each link of the chain accepts a significant liability for the quality of the entire chain. The present invention eliminates the risk and liability issues associated with this market, and reduce consumer related death rates ultimately reducing insurance rates and increasing profit for the associated businesses as any spoilage or deteriorated products are typically paid for by the seller of the goods.

All SMPs have at least one transition temperature (hereinafter "$T_g$") at which point the SMP transitions between a hard rigid plastic to a soft, pliable, elastomeric polymer. When the SMP is above its $T_g$ it is soft, when below its $T_g$ it is hard. Once the temperature of the SMP is above its $T_g$ the SMP can generally be deformed into the desired shape. The SMP must be cooled below its $T_g$ while maintaining the desired deformed shape to "lock" in the deformation. Once the deformation is locked in, the polymer network cannot return to its "memorized," or original shape due to thermal barriers. The SMP will hold its deformed shape indefinitely until it is again heated above its $T_g$, when the SMP stored mechanical strain is released and the SMP returns to its "memorized" shape. It is important to note that the $T_g$ represents the average temperature at which a material transitions from a rigid polymer to an elastomeric polymer. Because it is an average temperature the polymer can sometimes exhibit limited shape memory recovery below the $T_g$. Typically this limited recovery is small enough and occurs close enough to the $T_g$ that it does not affect the function for which the SMP is designed.

While heated above its $T_g$, the SMP has the flexibility of a high-quality, dynamic elastomer, tolerating up to 400% or more elongation; however, unlike normal elastomers, SMP can be reshaped or returned quickly to its memorized shape and subsequently cooled into a rigid plastic a change that can be repeated without degradation of the material The SMP transition process is a thermo-molecular relaxation rather than a thermally-induced crystalline phase transformation, as with shape memory alloys (hereinafter "SMAs"). In addition, SMPs demonstrates much broader range and versatility than SMA in shape configuration and manipulation.

SMPs are not simply an elastomer, nor simply a plastic. They exhibit characteristics of both materials, depending on its temperature. While rigid, SMP demonstrates the strength-to-weight ratio of a rigid polymer; however, normal rigid polymers under thermal stimulus simply flow or melt into a random new shape, and they have no "memorized" shape to which they can return. While heated and pliable, SMP has the flexibility of a high-quality, dynamic elastomer, tolerating up to 400% or more elongation; however, unlike normal elastomers, SMP can be reshaped or returned quickly to its memorized shape and subsequently cooled into a rigid plastic. Depending on the type of SMP used the activation temperature is customizable to between −30° F. and 520° F. (−40° C. to 270° C.).

There are three types of thermally activated SMP: 1) partially cured resins, 2) thermoplastics, and 3) fully cured thermoset systems. There are limitations and drawbacks to the first two types of SMP. Partially cured resins continue to cure during operation and change properties with every cycle. Thermoplastic SMP "creeps," which means it gradually "forgets" its memory shape over time. A thorough understanding of the chemical mechanisms of involved will allow those of skill in the art to tailor the formulations of SMP to meet specific needs.

Several known polymer types exhibit shape memory properties. Probably the best known and best researched polymer type exhibiting shape memory polymer properties is polyurethane polymers. Gordon, Proc of First Intl. Conf. Shape Memory and Superelastic Tech., 115-120 (1994) and Tobushi et al., Proc of First Intl. Conf. Shape Memory and Superelastic Tech., 109-114 (1994) exemplify studies directed to properties and application of shape memory polyurethanes. Another polymeric system based on crosslinking polyethylene homopolymer was reported by S. Ota, *Radiat. Phys. Chem.* 18, 81 (1981). A styrene-butadiene thermoplastic copolymer system was also described by Japan Kokai, JP 63-179955 to exhibit shape memory properties. Polyisoprene was also claimed to exhibit shape memory properties in Japan Kokai JP 62-192440. Another known polymeric system, disclosed by Kagami et al., *Macromol. Rapid Communication,* 17, 539-543 (1996), is the class of copolymers of stearyl acrylate and acrylic acid or methyl acrylate. Other SMP polymers known in the art includes articles formed of norbornene or dimethaneoctahydronaphthalene homopolymers or copolymers, set forth in U.S. Pat. No. 4,831,094.

The primary design components of thermally activated SMPs include at least one monomer, possibly a co-monomer, a crosslinker, and possibly an initiator and additional filler material. A polymer engineered with shape memory characteristics provides a unique set of material qualities and capabilities that enhance traits inherent in the polymer system itself. SMPs can be chemically formulated with a transition temperature to match any application need. It can be cast and cured into an enormous variety of "memorized" shapes, from thick sheets and concave dishes to tiny parts or a complicated open honeycomb matrix.

There are other methods besides thermal energy to activate the shape memory properties of SMP. Radiation, UV light, Magnetism, can be used to activate the SMP. Throughout this application "activation" is defined as transitioning the material from a hard rigid state to a soft pliable state. Additionally throughout this application "deactivation" is defined as transitioning the material from a soft pliable state to a hard rigid state.

Water activated SMP is a thermally activated SMP. As water is absorbed by the SMP this absorption of water lowers the thermal activation temperature such that the SMP will return to its memorized shape at a lower $T_g$ than it would have had it not absorbed the water.

Many articles have been published recently describing this phenomenon. See Chen, et. al. *Thermosetting Polyurethanes with Water-Swollen and Shape memory properties*, Journal of Applied Polymer Science Vol 84 1504-1512 (2002); Huang, et. al, *Water-driven Programmable polyurethane shape memory polymer: Demonstration and mechanism*, Applied Physics Letters 86, 114105 (2005); Yang, et. al., *Qualitative separation of the effects of carbon nano-powder and moisture on the glass transition temperature of polyurethane shape memory polymer*, Scripta Materialia 53 105-107 (2005); and Yang, et. al., *Effects of moisture on the glass transition tem-*

*perature of polyurethane shape memory polymer filled with nano-carbon powder*, European Polymer Journal 41 1123-1128 (2004).

Shape memory polymer material is the critical enabling technology for the present invention. Multiple corporations provide various SMP materials for various applications. Among them are (a) Composite Technology Development, Inc. (Lafayette, Colo.) www.ctd-materials.com; (b) ILC Dover LP (Frederica, Del.) www.ilcdover.com; (c) mnemoScience GmbH (Aachen, Germany) www.mnemoscience.com; and (d) Mitsubishi Heavy Industries, Ltd. (Nagoya, Japan) www.mhi.co.jp; and (e) Cornerstone Research Group Inc. (Dayton, Ohio) www.crgrp.com. Of the above those from Cornerstone Research Group Inc. are particularly preferred.

Shahinpoor et al, U.S. Pat. No. 5,735,067 discloses a temperature sensor having an indication surface, at least one SMA member with a first shape at temperatures below a critical temperature and a second shape at temperatures above the critical temperature, and a plurality of indicators mounted with the members which obscure the indication surface when the members are in the first shape, and do not obscure the indication surface when the members are in the second shape. The shape change of the SMA element causes the sensor to change between two readily distinguishable states to indicate that a temperature threshold was exceeded, and must always be maintained at a temperature below the transformation temperature of the SMA member(s) until the beginning to the sensing operation.

Akers, U.S. Pat. No. 6,848,390 disclosure a cumulative thermal exposure monitor having a fluid sealed inner cavity and a thermally responsive member formed of a shape memory material which moves an indicator. The housing, cavity, and shape memory material transition temperature ranges are calibrated relative to one another such that the shape memory material gradually changes from one shape to another depending on the environmental temperature.

Akers essentially uses a variety of materials to insulate the shape memory material from the environment to control the amount of thermal energy it absorbs. Shahinpoor uses SMA to indicate a single threshold temperature has been crossed. The device disclosed by Akers does not allow for sudden temperature changes as the time needed for the temperature changes in the outside environment to reach the shape memory material prevents its movement. Additionally the cost necessary to balance the insulation, housing and other material for each situation is expensive and time consuming. Likewise the device disclosed by Shahinpoor can only tell if a single threshold temperature has been crossed, not if a cumulative exposure to a lower temperature has spoiled or made unfit for use a material.

Debord et al, U.S. Pat. No. 7,057,495 discloses an electronic assembly contained in a label that performs time-temperature integration (hereinafter "TTI") and indicates that time and/or temperature levers have been reach that will compromise the safety or shelf-life of an item. The principal drawback with this method is that the sensor must have electricity to run. The current devices do not need electricity to monitor the environmental conditions around them.

Other technologies exist that are used for passive temperature sensing. The major technologies that are used for these devices are 1) chemical diffusion to show color change and 2) heat transfer to enact a change in polymer modulus. Products such as Checkpoint® labels (http://www.vitsab.com/) that use chemical diffusion technology are low profile and can be easily integrated into packaging. However, their resolution in interpreting freshness for some markets is under debate and remains a barrier to widespread acceptance. Time Temperature Integration, LLC products use controlled heat transfer and polymer modulus change to indicate freshness. This product is bulkier than the chemical diffusion labels; however, the resolution of the TTI is better throughout the desired time period. Both technologies have limitations in their resolution and design flexibility when compared to SMP-based sensors.

Therefore there is a need in the field for a cheap method to easily and quickly identify a material that is unfit for use due to deterioration or spoilage because of exposure to certain environmental conditions. The present invention overcomes these limitations by providing a cheap, easy to use, visual indication of the fitness for use or spoilage of an item.

BRIEF SUMMARY OF INVENTION

The present invention utilizes the unique properties of shape memory material, in particular shape memory polymers, to cumulatively track the exposure of products to thermal energy and water vapor pressure.

It is therefore an object of the present invention to provide a cumulative thermal exposure monitor and a cumulative water vapor pressure exposure monitor to track the absorption of thermal energy and water by a product over time and visually display that information in an easily read format.

It is another object of this invention to provide a cumulative thermal exposure monitor that monitors and indicates whether or not a product or container with which it is associate has absorbed sufficient water, thermal energy, or a combination of the two as to render it unfit for use.

Another object of this invention is to provide a cumulative exposure monitor to track thermal energy and moisture exposure that can be used with perishable food products and perishable non-food products such as medical products, drugs, human organs and tissues, and other temperature or moisture sensitive products to indicate whether, at any time in the chain of distribution, the product was cumulatively exposed to sufficient temperatures or moistures as to render the product unfit for use.

Another object of this invention it to provide a cumulative sensor that is capable of functioning in a wide range of temperatures, specifically from −40° C. to over 300° C.

Another object of this invention is to provide a sensor that can be sterilized by chemical, ionizing radiation or heat.

Another object of this invention is to provide a cumulative sensor that is inexpensive and effective regulatory tool for world-wide government food handling compliance and allow real time decisions to be made as to the quality of a perishable item at any stage of the distribution chain.

A further object of this invention is to provide a cumulative sensor that is little danger of contaminating the product it is monitoring A still further object of this invention is to provide a cumulative sensor that is inexpensive to manufacture, may be deposable, and is economical to install on individual packages.

Other objects of the invention will become apparent from time to time throughout the specification and claims hereinafter related.

The objects of the present invention are accomplished by using the shape memory recovery effect of shape memory materials. After the desired storage conditions of a product are determined, a shape memory material is formulated which has a transition temperature at or above the desired storage temperature or the ability to monitor the water vapor pressure. The shape memory material is then deformed by heating the material, deforming it into the desired deformed shape, and maintaining that shape while the material is cooled to below its transition temperature. The deformed material is then inserted and connected to a housing incorporating an indicating device and placed on a product to be monitored. As the product is exposed to temperatures or water vapor pressures in excess of the desired storage conditions the material moves form its deformed shape to its memory shape. The change in memory shape is directly related to the exposure of the product to un-desirable environmental conditions. This exposure is tracked visually on the indicating device. Once the shape memory material has fully recovered to its shape memory, the product is generally unfit for use or consumption.

DISCLOSURE OF INVENTION

Figure 1:
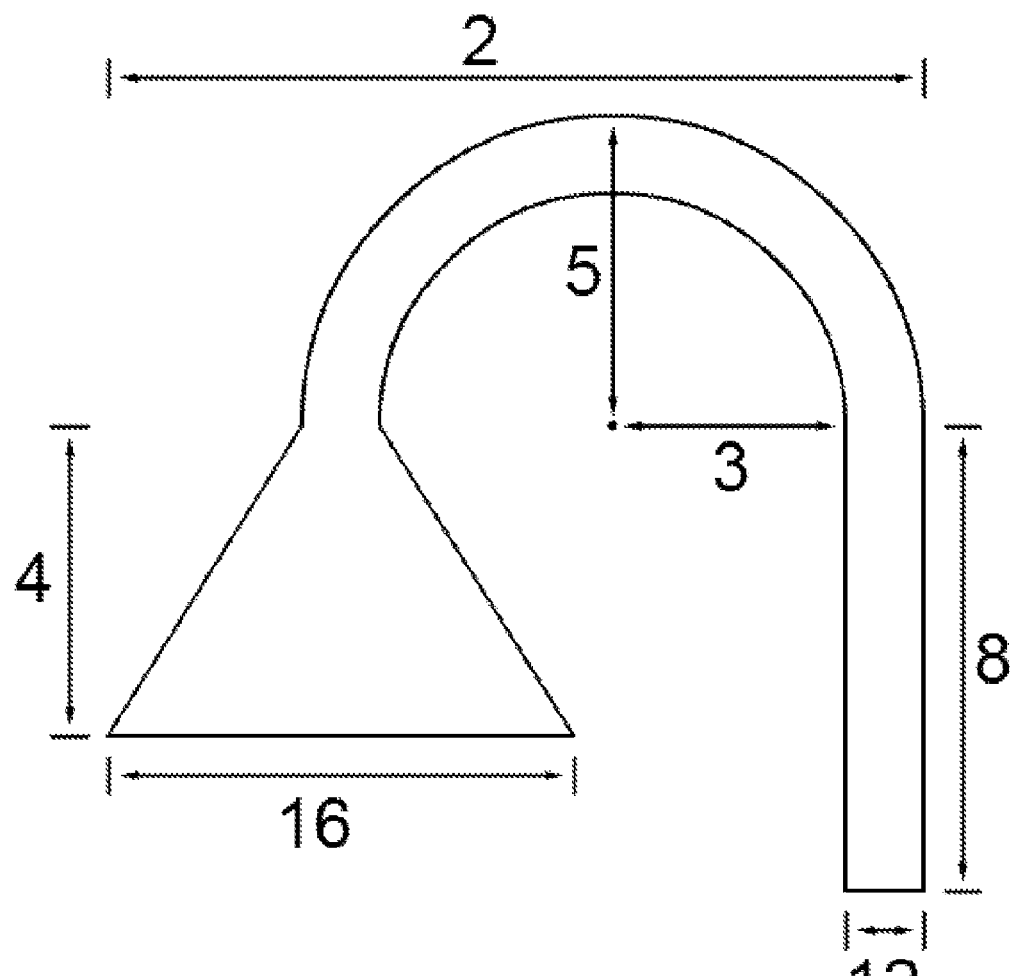
FIG. 1 Shows the exemplary design of the shape memory material as used in the exemplary method.

The present invention covers inexpensive temperature and humidity sensing devices that require no electrical power for tracking cumulative exposure to temperature and humidity. These sensors utilize the unique phase transition properties of shape memory polymers and other shape memory materials. "Shape memory" throughout this application means the ability of certain materials to return to a predetermined, or memorized, shape upon activation. Activation of the "shape memory" effect can be accomplished by a plurality of methods. The exemplary method of activation is by thermal energy. Other methods include light, radiation, other forms of electro-magnetic energy, magnetic fields, and electricity.

Additionally as used herein "product" refers to the thing or medium that is being monitored and may include food, medicines or other medical items, non-food items, drugs, chemicals, human organs or tissues, ordinance or ammunition, or any other item or substance that may be subject to deterioration upon exposure to various environmental conditions over time.

As used herein the phrase "preferred storage temperature" refers to the temperature or temperature range within which a product must be maintained to minimize or prevent any deterioration due to exposure to extreme environmental conditions.

Various base polymers can be used to make a SMP. Styrene copolymer based SMPs which could be used are disclosed in U.S. Pat. No. 6,759,481 which is incorporated herein by reference. Cyanate ester copolymers can also be used and are disclosed in PCT application WO/2005/108448 published on Nov. 11, 2005 and is incorporated herein by reference. In addition shape memory alloys, polyurethanes, polyethylene homopolymers, styrene-butadiene, polyisoprene, copolymers of stearyl acrylate and acrylic acid or methyl acrylate, norbornene or dimethaneoctahydronaphthalene homopolymers or copolymers, maleimide polymers and other similar materials are within the scope of the present invention.

The current invention has obvious advantages over previous designs that are either bulky or time consuming to make. The present invention allows for high volume production at costs of less than ten cents a sensor in some cases. This technology also allows sensors to meet the needs of many specific scenarios, with sensing periods ranging from minutes to years to decades. By understanding then structure-properties-relationship inherent in SMPs it is possible to design a wide variety of SMP and to tailor SMPs to meet specific engineering needs. This particular application requires a SMP that will be sensitive and responsive to the either the temperature or moisture content of the environment.

Additionally, SMPs can be tailored to be sensitive to both heat and moisture in the same device by incorporating hydrophilic components into the SMP network structure. It has been demonstrated that a significant difference in water vapor permeability of a polyurethane SMP can be achieved by heating it above or cooling it below its glass transition temperature when polyethylene glycol (PEG) components are incorporated. The presence of the hydrophilic segments, such as PEG, allow the SMP to transport water molecules once they have gained enough mobility above their glass transition temperature. This affinity to water by the hydrophilic segments makes them responsive to moisture content in the environment. When a pre-strained SMP containing hydrophilic segments is exposed to moisture, these hydrophilic segments will continue to absorb water depending on the moisture content of the environment. Since the absorbed water molecules can effectively act as a plasticizer for the SMP matrix, the resulting lowering of $T_{(g)}$ facilitates the shape recovery or activation. Thus, the degree of shape recovery or actuation of the moisture-sensitive SMP will depend on its history of moisture and/or temperature exposure.

In the first embodiment, a device uses the shape memory effect to detect thermal events and track them. It is important to characterize and correlate the sensor material's $T_g$ and preferred storage temperature of the product. FIG. 15 shows the relationship between temperatures that will be recorded by the device and those that will not. Temperatures above the $T_g$ designated line with create "over-exposure units", as shown by 100, which will cause a deformed shape memory to begin moving toward its memory shape. The higher the temperature or the long the temperature remains above the $T_g$ line, the more the shape memory material will move from its deformed shape to its memory shape.

The exemplary method uses a basic sensor design which is a simple, easy-to-read device that indicates a cumulative thermal exposure. FIG. 1 shows the design of the shape memory material, 2, in its memory shape. The shape memory material can be manufactured to any size, however, the smaller the material the cheaper the cost. The design shown in FIG. 1 is relatively small. By using a computer controlled laser cutters, design tolerances of one-thousandth of an inch are possible. Dimension 4 is only 0.2500 inches, dimension 8 is only 0.3750 inches, dimension 12 is only 0.1250 inches, dimension 16 is 0.3750 inches, radius 3 is only 0.1875 inches and radius 5 is only 0.3125 inches. The thickness of the material is determined depending on the product being monitored as discussed below. This technology can be used for measuring multiple scenarios varying from minutes to years at various temperatures ranging from −40° F. to 500° F., −40 deg. C., to 270 deg. C. While these measurements were used because of size and cost, the sizes and shapes of the shape memory material may be altered and are adaptable to any temperature range or visual display device.

Assuming a constant thermal conductivity and heat capacity in the sensing materials, the primary engineering drivers for the sensor design are configuration and response-time scaling thickness of the sensor design. These drivers are discussed below.

It is expected that multiple configurations may be required to meet the needs of various sensing scenarios. Advantages and disadvantages of different configuration will be obvious to those of skill in the art and can be used to build a sensor useful for a particular industry.

The response time of a given configuration is primarily dictated by the time it takes the material to reach thermal equilibrium and the specific temperature level. A straightforward method of controlling the response time is by varying the cross-sectional thickness of the sensor material. It will take longer to reach thermal equilibrium (and begin shape recovery) with thicker cross-sections, as long as the thermal conductivity and heat capacity of the formulation are constant and uniform. Conversely, increased cross-sections will reduce sensitivity because certain temperature excursions will not be long enough to achieve equilibrium. Thus the thickness of the deign shown in FIG. 1 will depend on the sensitivity needed.

Figure 2:
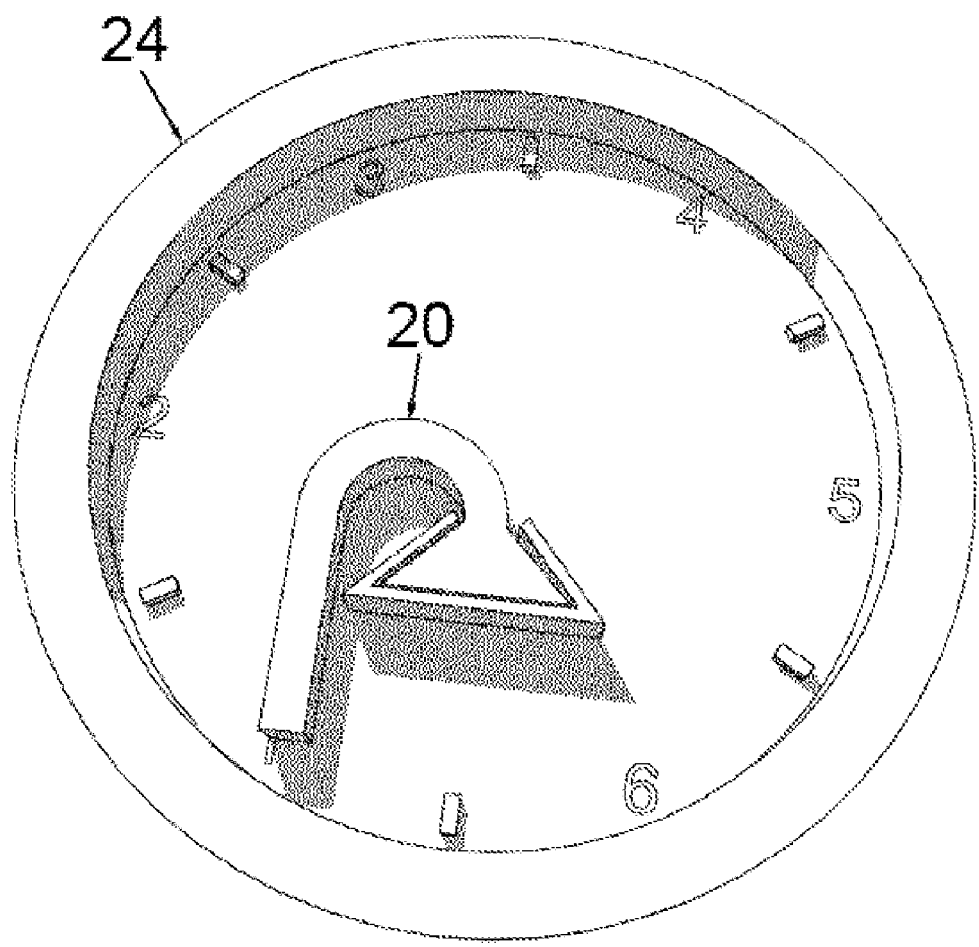
FIG. 2 shows the exemplary method of using the shape memory material to visually indicate the product being monitored has not deteriorated.

Because this device tracks and integrates the cumulative exposure, each section on the dial shown in FIG. 2 represents a ten-fold increase in the number of over-exposure units (hereinafter "OEUs"), as shown in FIG. 15, 100, the product has been exposed too. For example, in FIG. 2, area 1 indicates an exposure of up to 10 OEUs while area 2 will indicate an exposure of up to 100 OEUs. Once the material reaches its memory shape, the product has likely deteriorated to the point it cannot be safely used.

Figure 3:
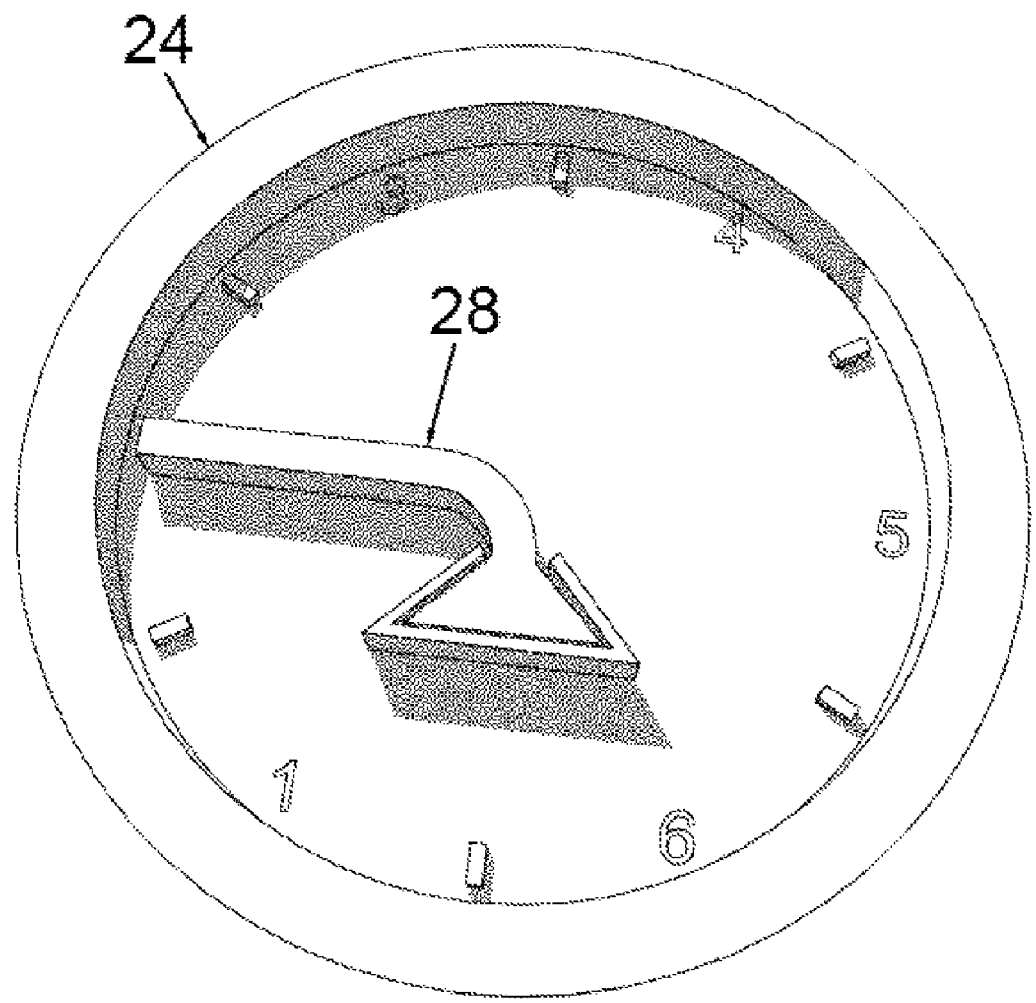
FIG. 3 shows the exemplary method of using the shape memory material to visually indicate the product being monitored has deteriorated such that approximately 10% of is shelf life has expired.
Figure 4:
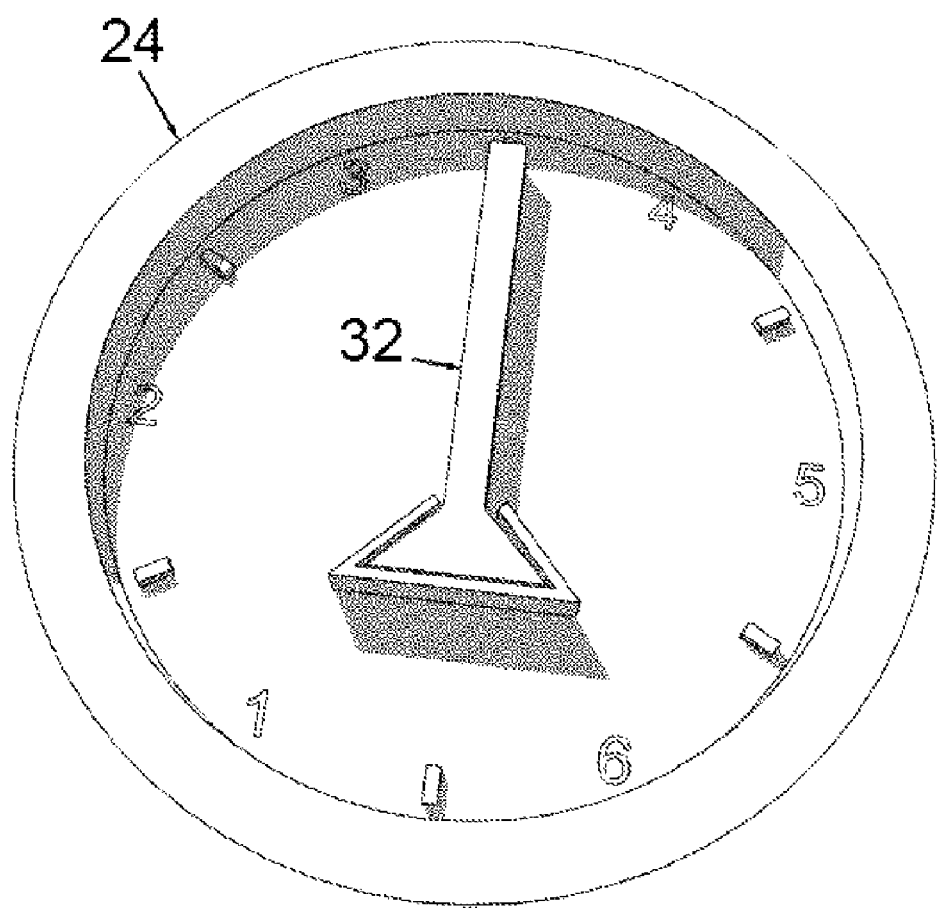
FIG. 4 shows the exemplary method of using the shape memory material to visually indicate the product being monitored has deteriorated such that approximately 25% of its shelf life has expired.
Figure 5:
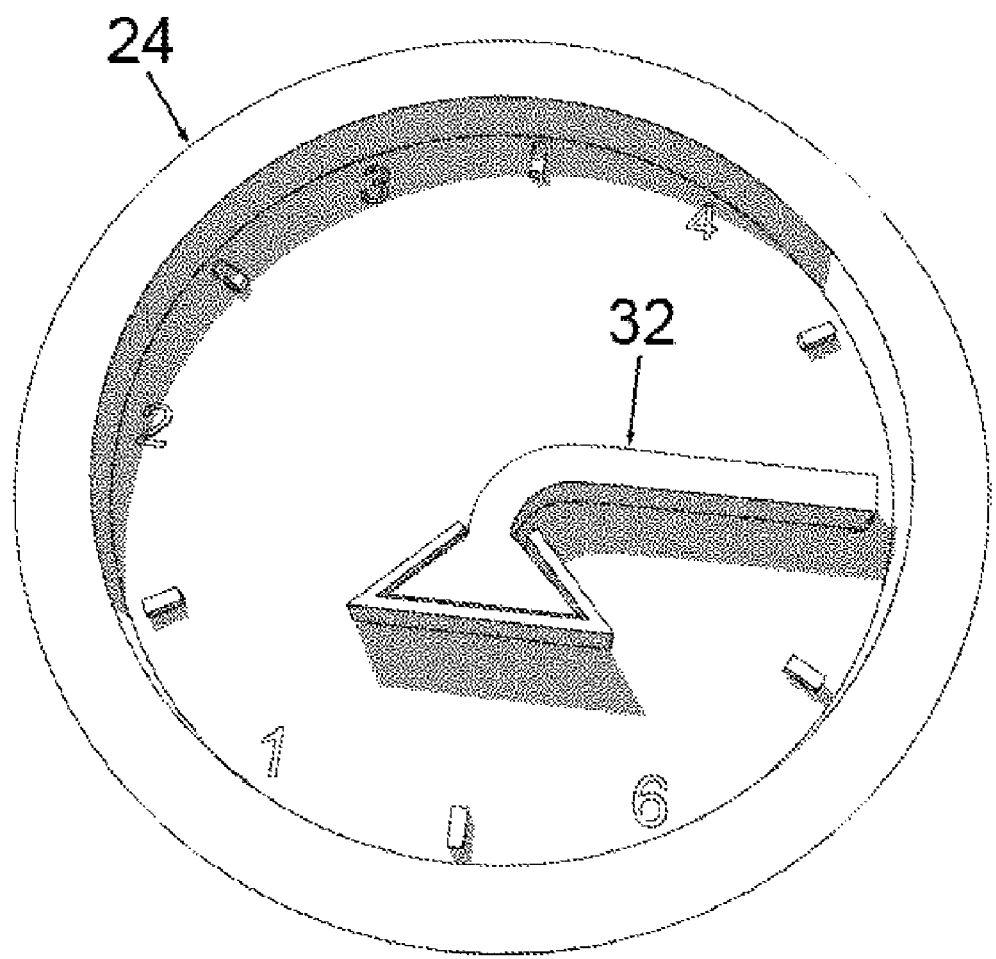
FIG. 5 shows the exemplary method of using the shape memory material to visually indicate the product being monitored has deteriorated such that approximately 75% of its shelf life has expired.
Figure 6:
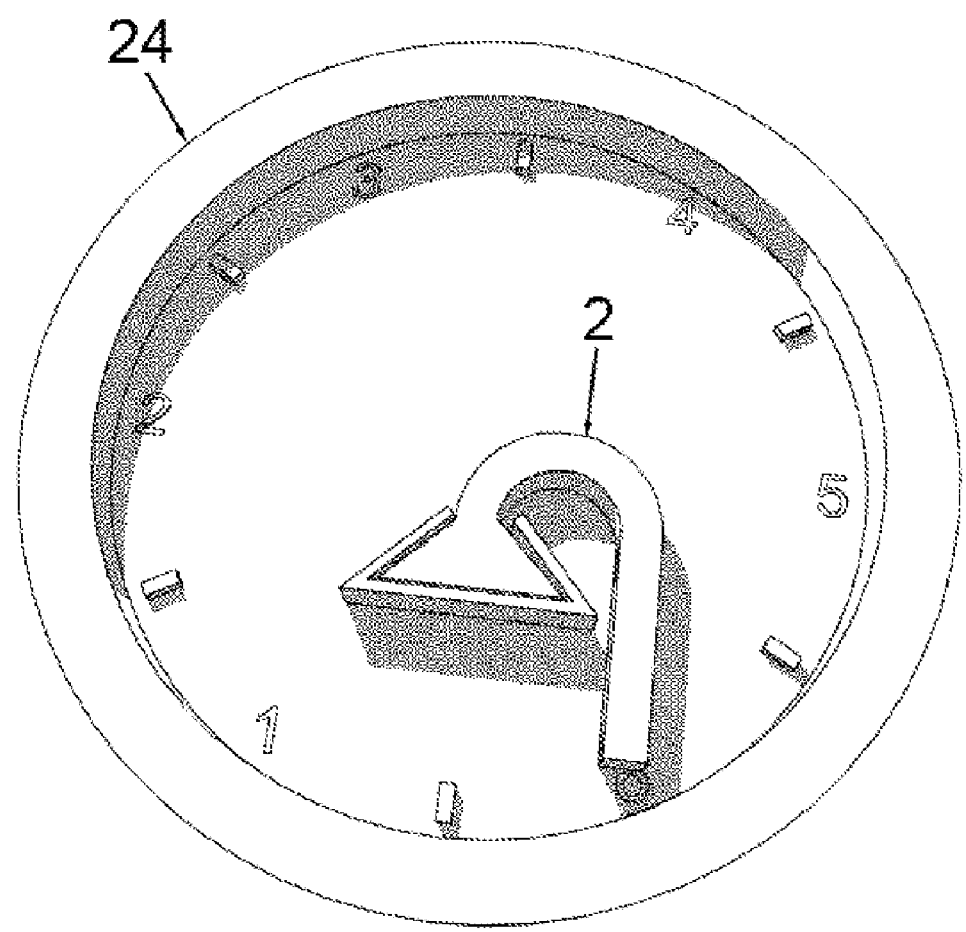
FIG. 6 shows the exemplary method of using the shape memory material to visually indicate the product being monitored has expired or is unfit for use.

FIG. 2 shows the memory material, 20, in its deformed shape, ready to be used as part of a device, 24, tracking the exposure of a product to excessive thermal energy and/or high temperatures. Referring back to FIG. 15, as the environmental temperature around a product increases, the sensor will begin to return to its memory shape as shown in FIG. 3, where the shape memory material, 28, has begun to return. FIGS. 4-6 show the material tracking the exposure of a product to thermal energy until it finally returns to its memory shape, 2, as shown in FIG. 6.

Figure 7:
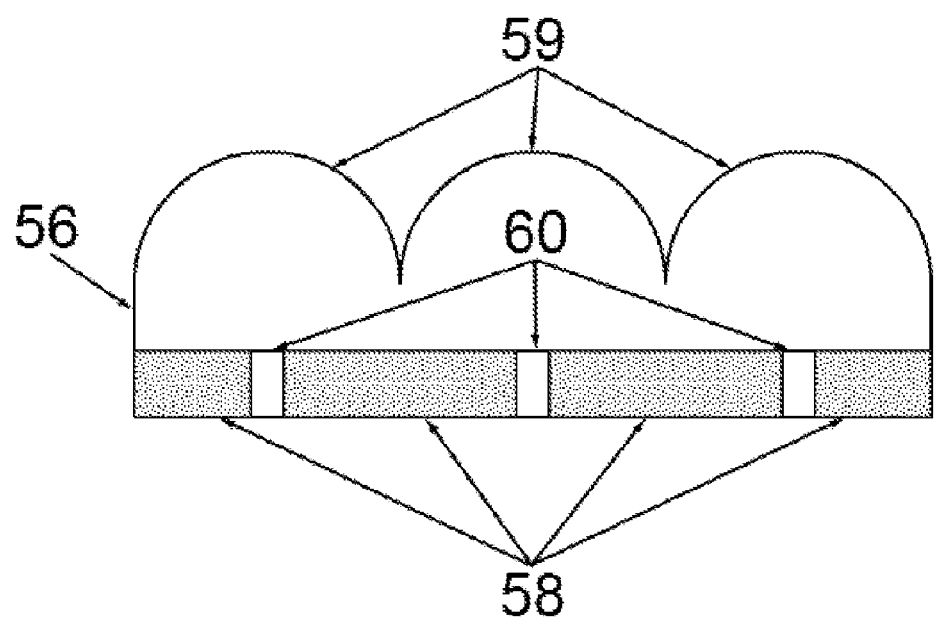
FIG. 7 shows a second method of using shape memory polymer and optical refraction to allow a viewer to see only a color indicating that the product being monitored has not expired.
Figure 8:
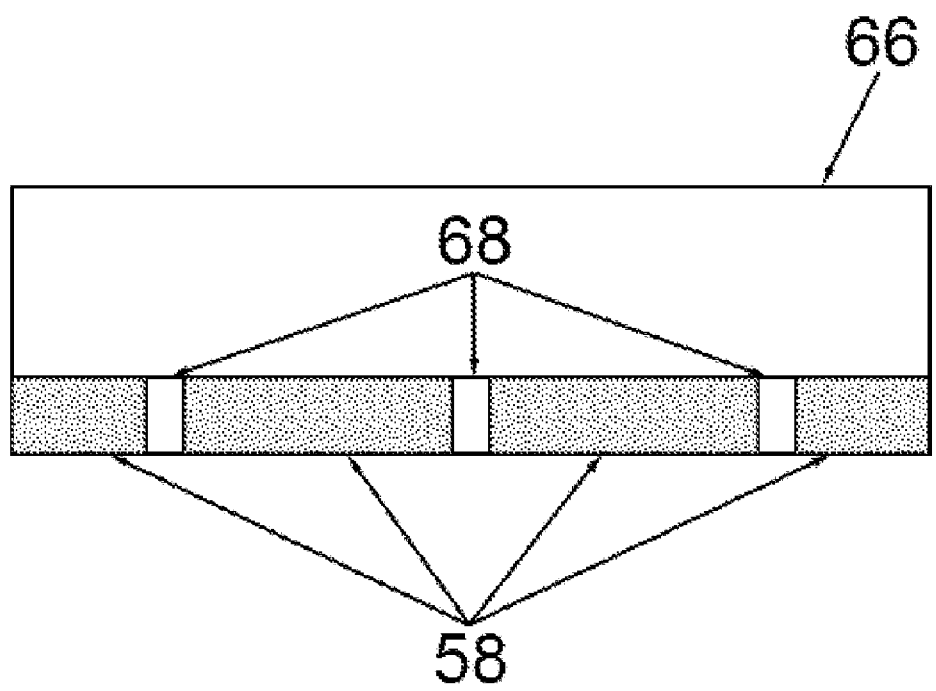
FIG. 8 shows the second method of using shape memory polymer and optical refraction to allow a viewer to mostly see a color indicating that the product has expired or is unfit for use.

In a second embodiment the shape memory material is used to optically indicate whether a material is good or expired. In FIG. 7 the shape memory material is initially deformed into a plurality of prisms or optical lenses, 59. Underneath the shape memory material is an alternating pattern of two colors, 58 and 60. The optical lenses, 59, are initially shaped such that a viewer looking through the lenses will only see the colors, 58, indicating the material is good. As the shape memory material is exposed to temperatures in excess of the materials $T_{(g)}$, the lenses will begin become flat. Eventually, the entire shape memory material will be flat, as shown in FIG. 8, 66. Once flat a viewer looking through the shape memory material will predominantly see the color, 60, indicating the material has likely deteriorated and is unfit for use.

Figure 9:
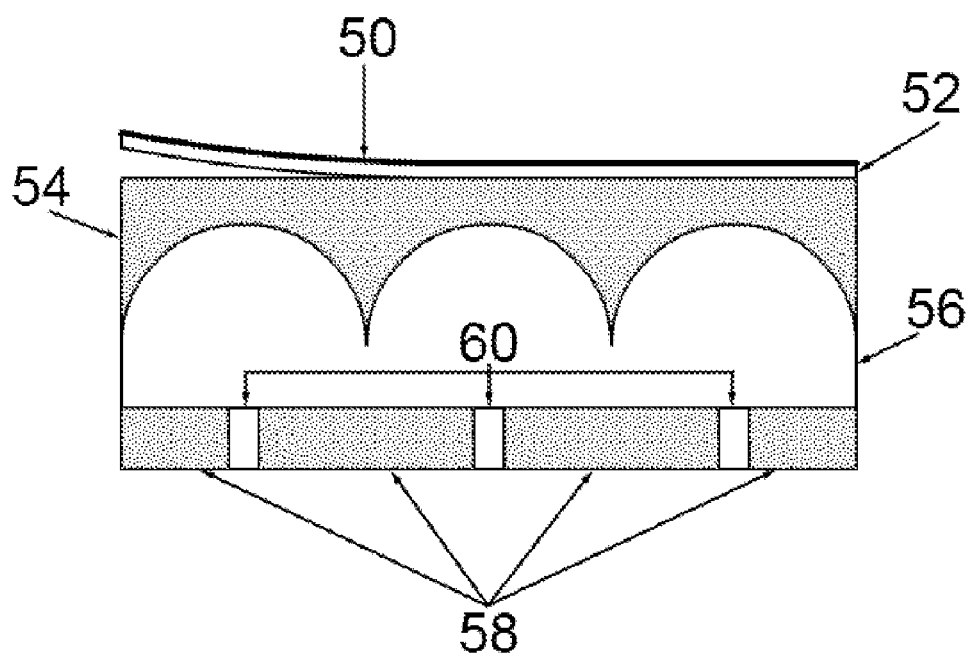
FIG. 9 shows the second method of using shape memory polymer and optical refraction with various means to protect the shape memory polymer from wanted, early deformation and a means to attach it to a monitored product.

This method has some drawbacks, in that it is easy to damage the optical lens surface of the material shown in FIG. 7. This may be overcome by adhering an optically clear protective layer, 54, onto the lens surface as shown in FIG. 9. Additionally a thin, removable coating, 52, may be added to prevent the material from being prematurely activated or used. Finally an adhesive coating, 62, may be applied underneath the device to assist in securing it to a product.

Figure 10:
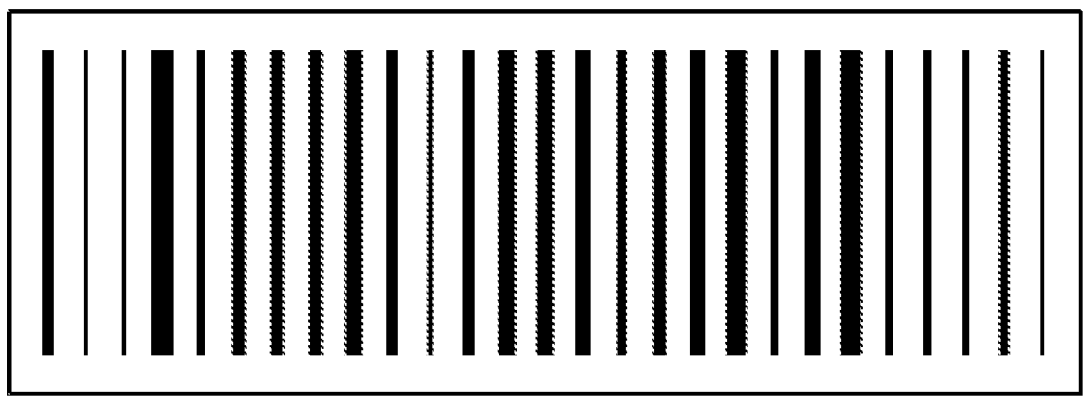
FIG. 10 shows a bar code coated a shape memory polymer.
Figure 11:
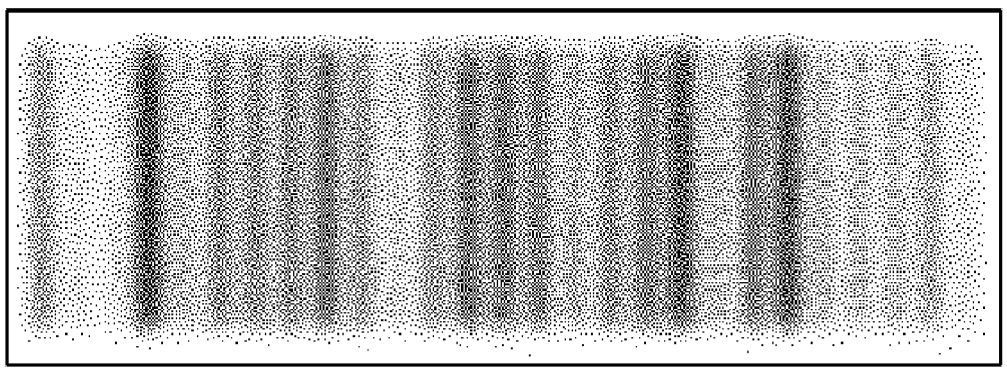
FIG. 11 shows a bar code coated with shape memory polymer that has been deformed by exposure to excessive temperatures and has blurred the bar code so that it cannot be read by a bar code reader and sold.
Figure 12:
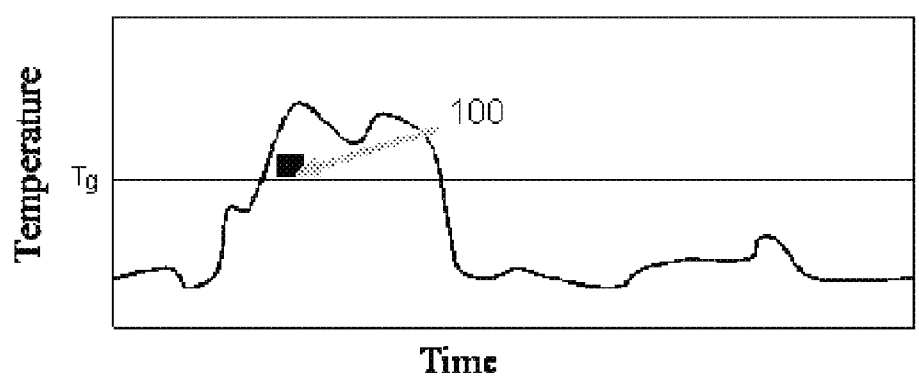
FIG. 12 is a graph showing the relationship between temperatures which will cause the shape memory material to return to its memory shape and those temperatures at which it will remain in its current shape.

Another method of achieving the objects of the invention is show by FIGS. 10-11. FIG. 10 shows a bar code covered by SMP. FIG. 11 shows the same bar code covered by SMP after exposure to temperatures above the transition temperature of the material. Once the SMP has obscured, or blurred, the bar code and optical scanner cannot read it and will prevent or minimize the risk of an expired product from being sold.

In addition to cumulative exposure, the devices can be designed to rapidly recover their memory shape upon a single exposure to an excessive temperature.

A final advantage of the current system is that for the sensors can be reheated, resent to a deformed shape, and reused. This provides significant advantages for expensive sensing devices over the typical closed, one use devices.

The following examples are provided to illustrate the scope of the present invention. Because these examples are given for illustrative only, the invention should not be deemed limited thereto.

Example 1

Styrene Based Shape Memory Polymer Tag

A polymeric reaction mixture was formulated by mixing vinyl neodecanoate (10%), divinyl benzene (0.8%), and styrene (85.2%) in random order to yield a clear solution. Benzoyl peroxide paste (4%) which is 50% benzoyl peroxide, was then added to the resulting solution (all composition % are by weight). The resulting solution was kept cold in a refrigerator before use. To prepare the shape memory polymer resin sheet a mold was fabricated consisting of a 3" by 3" glass plate with a Viton ring encompassing the mold area. The reaction mixture formulated above was poured into the area encircled by the Viton. The mold was sealed by placing a 3" by 3" glass plate on top of the Viton ring. The two sheets of glass were held together by clamps around the edges. The Viton spacer also acts as a sealant in the mold. The entire system was then placed in a high temperature vacuum bag with a vacuum valve stem and apply vacuum applied thoroughly, ensuring that there were air no leaks. The material was then cured with the following cycle: 1) A one hour linear ramp to 75° C. in an oven, autoclave, or other form of controlled heating device; 2) A 3 hour hold at 75° C.; 3) A 3 hour linear ramp to 90° C.; 4) A 2 hour linear ramp to 110° C.; 5) A one hour linear ramp to 20° C. After curing, remove from oven and allow to cool. Remove vacuum bag and glass plates from the material. The designs as shown in FIG. 1 were then laser cut out of the sheet. These devices were then placed on a dial, similar to that shown in FIG. 2 and used to monitor the exposure of a product to thermal energy.

Example 2

Epoxy Based Shape Memory Polymer Tag

A polymeric reaction mixture was formulated by mixing bisphenol-A-diglycidyl ether (78.46%), 4,4' methylenedianiline (0.90%), and aniline (20.65%) where all percentages are by weight. The Bisphenol-A-diglycidyl ether is kept in a heated drum so it remains a liquid. If it crystallizes, melting it will have no ill effects on the resin. The 4,4' methylenedianiline comes in solid pellets and was weighed out and added to the Aniline. The Aniline/4,4' methylenedianiline was sonicated in the ultra sonicator until the 4,4' methylenedianiline was completely dissolved in the aniline. The Aniline/4,4' methylenedianiline mixture was added to the Bisphenol-A-diglycidyl ether, using a transfer pipette. The resin was then mixed until the resin was homogenous. The resin is then transferred to a glass/viton mold by pouring, injecting or pumping the resin into the mold. The mold is generally 2 glass plates, coated with WOLO mold release, and held together with binder clips or hand clamps, with viton caulk or a viton O-ring sandwiched between them. If the resin is injected or pumped into the mold with viton caulk a space is left at the top of the mold for the syringe or pump to fit. After the resin is injected or pumped the mold is sealed by fusing together the viton cord with viton caulk. If the resin is injected into a mold with an O-ring the syringe needle is placed behind the O-ring and carefully slid out after injection to make sure the mold is fully sealed. If the resin is poured into the mold the resin is poured on the $1^{st}$ glass plate in the middle of the o-ring and the 2nd glass plate is placed on top of the resin and pushed straight down to force the resin to flatten, preventing voids, and the corners or edges of the mold clamped. In all instances a small amount of head room is left empty to prevent the resin from breaking the glass as it expands or contracts slightly during curing. The samples were labeled and put vertically in a 125° C. oven to cure for 24 hours. The designs noted in FIG. 1 are then laser cut from the sheets to form the sensors.

Example 3

Acrylate Based Shape Memory Polymer Tag

A polymeric reaction mixture was formulated by mixing 1.0% 1,6-hexanediol diacrylate, 48% methyl methacrylate, 50% butyl acrylate, and 1.0% percent benzoyl peroxide to achieve a homogenous mixture, all percentages are by weight. Enough reagents to make 160 grams of resin were mixed together in the order listed above. The resin was injected into a mold. The mold was composed of two glass plates, coated in WOLO mold release and a Teflon o-ring. Ten clamps held the mold together. Disposable syringes and needles were used to inject the liquid resin into the mold. The resin was cured at 65 degrees Celsius for two hours, then at 80 degrees Celsius for 22 hours. The designs noted in FIG. 1 are then laser cut from the sheets to form the sensors.

Water Vapor Pressure Monitoring

In an additional embodiment, moisture-sensitive shape memory polyurethanes can be obtained by employing diol-terminated poly(caprolactone) (PCL diol), hexamethylene diisocyanate (HDI), MDI, and hexamethylene diamine (HDA) as the base matrix. Hydrophilic segments, such as PEG or polyvinylpyrrolidinone, can be incorporated into the SMP matrix to obtain the desired moisture sensitivity. This moisture sensitivity of SMP can be tailored by formulating various contents of hydrophilic segment into the SMP matrix. Furthermore, since the mobility of hydrophilic segments depend on the molecular weight of the segment in the SMP matrix, with shorter segments having lower mobility due to more restricted motion, the effectiveness of moisture absorption and plasticization of the resulting SMP can be fine-tuned by selecting the appropriate molecular weight of the hydrophilic segment to be incorporated into the matrix.

The structure of a hydrophilic monomer is somewhat more similar to water than other monomers. This makes water more attracted to the monomers, sometimes so much so that they are water-soluble. When hydrophilic monomers are polymerized and cross-linked, they are no longer water-soluble, but the polymer structure is still hydrophilic. The polymer will therefore absorb water into itself, but it will not dissolve. As water enters the polymer, the polymer swells and softens, becoming flexible. The water lowers the $T_g$ of the polymer, allowing the polymer to recover its memory shape.

As mentioned above, even though activation means the method by with the shape memory effect of is activated, water "activated" SMP throughout this application does not use water as the activation means. Rather, absorption of thermal energy is the activation means because as water is absorbed by the SMP the thermal activation temperature is lowered such that the SMP will return to its memorized shape at a lower $T_g$ than it would have had it not absorbed the water. Eventually, the SMP will absorb enough water such that its $T_g$ will be that of the environment and will return quickly to its memorized shape.

If two or more monomers are used one can be non-hydrophilic (i.e. monomers with lower polarity, incapable of forming hydrogen bonding, atoms of lower electronegativity, or few lone electron pairs), (0-75 wt %), hydrophilic (25-99 wt %) As long as the final polymer will absorb water, the SMP will be water-activated to some degree.

Hydrophilic monomers are the main component of water activated SMP. The composition of the main hydrophilic monomer has varied from approximately 50-98.75 weight percent. Hydrophilic monomers that we have used to make water-activated SMP are as follows: acrylamide, acrylic acid, 2-hydroxyethyl acrylate, 4-vinyl pyridine, 1-vinyl-2-pyrrolidinone. (FIG. 1) Additionally, other monomers could be used, as long as they are hydrophilic enough to absorb water when polymerized (i.e. monomers with relatively high polarity, hydrogen bonding, atoms of higher electronegativity, lone electron pairs). The monomers can be mixed in various proportions to tailor the water-sensitivity and $T_g$ of the SMP. If both hydrophilic used (0-99 wt %)*(2 monomers) Acrylic acid has been mixed with 2-hydroxyethyl acrylate, and acrylamide has been mixed with 2-hydroxyethyl acrylate. 4-Vinyl pyridine has been mixed with 1-vinyl-2-pyrrolidinone with good success. Other combinations are possible as long as the monomers can successfully polymerize together.

Vapor pressure measures the water vapor content of the air using the partial pressure of the water vapor in the air. Pressure may be expressed using a variety of units: in pascals, millibars, pounds per square inch, among others. The gases in the atmosphere exert a certain amount of pressure (about 1013 millibars at sea level). Since water vapor is one of the gases in air, it contributes to the total air pressure. The contribution by water vapor is rather small, since water vapor only makes up a few percent of the total mass of a parcel of air. The vapor pressure of the water in the air at sea level, at a temperature of 20° C., is 24 millibars at saturation. Vapor pressure is not easily determined directly. It is actually easier to measure relative humidity.

Relative humidity is a ratio that compares the amount of water vapor in the air with the amount of water vapor that would be present in the air at saturation. One way it can be stated would be as the ratio of the actual mixing ratio to the saturation mixing ratio. Relative humidity is given as a percentage; the amount of water vapor is expressed as a percent of saturation. Additionally, different levels of resolution will likely be required.

The primary engineering drivers for the sensor design are expected to be configuration and response-time scaling of the sensor design. The response time of a given configuration will likely be dictated by the time that it takes the material to reach moisture equilibrium level. A straightforward method of controlling the response time is by varying the cross-sectional thickness of the sensor material. It will take longer to reach a moisture equilibrium (and begin shape recovery) with thicker cross-sections, as long as moisture permeation of the polymer increases with increased vapor pressure levels (at some rate yet to be determined.) Conversely, increased cross-sections will reduce sensitivity because certain temperature excursions will not be long enough to achieve equilibrium. Engineering tradeoffs associated with this aspect of the design will be weighed heavily.

In the first example, using water absorbing SMP, a device uses the shape memory effect to detect changes in the water vapor pressure or relative humidity around a product. It is important to characterize and correlate the sensor's ability to absorb water and the concurrent decrease in the material's $T(g)$ to ensure accurate results. Similar to the temperature measurement, the shape memory polymer will absorb water in the environment around the product. At lower vapor pressures of water, the material will absorb very little water and exhibit small if any change.

Again as shown in FIGS. 2-6 as the material absorbs water, its $T(g)$ is lowered and begins to recover its memory shape, until as show in FIG. 6 the material, 2, have fully recovered and indicates that the material is likely unfit for use. Because this device tracks and integrates the cumulative exposure to moisture, each section on the dial shown in FIG. 2 represents a ten-fold increase in the number of over-exposure units (hereinafter "OEUs"), as shown in FIG. 15, 100, the product has been exposed too. For example, in FIG. 2, area 1 indicates an exposure of up to 10 OEUs while area 2 will indicate an exposure of up to 100 OEUs. Once the material reaches its memory shape, the product has likely deteriorated to the point it cannot be safely used.

Likewise the additional methods that have been described for temperature sensing above can be used to monitor humidity be replacing the temperature sensitive shape memory material with a moisture sensitive shape memory polymer.

Assuming a constant moisture absorption capacity in the sensing materials, the primary engineering drivers for the sensor design are configuration and response-time scaling thickness of the sensor design. These drivers are discussed below.

It is expected that multiple configurations may be required to meet the needs of various sensing scenarios. Advantages and disadvantages of different configuration will be obvious to those of skill in the art and can be used to build a sensor useful for a particular industry.

The response time of a given configuration is primarily dictated by the time it takes the material to reach moisture equilibrium and the specific water vapor pressure of environment surrounding the product. A straightforward method of controlling the response time is by varying the cross-sectional thickness of the sensor material. It will take longer to reach moisture equilibrium with thicker cross-sections, as long as the physical properties of the formulation are constant and uniform. Conversely, increased cross-sections will reduce sensitivity because certain relative humidity excursions will not be long enough to achieve equilibrium. Thus the thickness of the design shown in FIG. 1 will depend on the sensitivity needed.

An advantage of these device is that they can be heated to remove the excess absorbed water, reset to a deformed position, and reused. This provides significant advantages for expensive sensing devices over the typical closed, one use devices.

In addition to cumulative exposure, the devices can be designed to rapidly recover their memory shape upon a single exposure to an excessive water vapor pressure.

The following example is provided to illustrate the scope of the present invention. Because this example is given for illustrative only, the invention should not be deemed limited thereto.

Example 4

A formulation was made with 98.5 weight percent 4-vinyl pyridine, 0.5 weight percent AIBN (initiator), and 1.0 weight percent divinyl benzene. Enough reagents to make 10 grams of resin were mixed together in the order listed above. The resin was injected into a mold. The mold was composed of two glass plates (coated in WOLO mold release) and a Viton o-ring. Four clamps held the mold together. Disposable syringes and needles were used to inject the liquid resin into the mold. The resin was cured at 60 degrees Celsius overnight (>16 hours). The sample was removed from the mold, and tested with DSC to confirm full cure. The $T_g$ of the dry sample was approx. 125° C., as shown by DMA data. Part of the sample was removed, and allowed to soak in water until it was fully saturated. The $T_g$ of the wet sample was approx. 20° C., also shown by DMA data. Water lowered the $T_g$ of this sample of water activated SMP by more than 100° C.

Additionally, because both the moisture and temperature sensors use the $T_g$ of the material to alter its shape, single sensor can be designed to monitor the combined effect of temperature and moisture on a single product and their effect on its fitness for use.

RFID Incorporation.

Radio frequency identification (hereinafter "RFID") systems abound in the art. These systems used electronically powered sensing devices to monitor temperatures of products and to communicate that information to a tracking system which can either correct the environmental problem, prevent the product from being sold, notify personnel of the problem, all of the above, or a multitude of other tasks.

Lindsay, U.S. Pat. No. 6,982,640 describes such a system. Lindsay provides for tracking the freshness or expiration of food products placed in storage. The food products are provided with tags containing the food product information and expiration dates. When scanned the tags provide that information to the system and the system makes a determination if the product is expired. Other methods include temperature measurement devices to track the temperature in the environment or the cumulative exposure to thermal energy.

The current invention can be incorporated into a RFID system. The advantages of incorporating this invention into such a system include a cheaper, easier to produce tag and a smaller or no internal electronic power supply.

To facilitate integration of the SMP sensor technology and RFID technology, small electrical components that cumulatively vary their electrical characteristics as a function of thermal and vapor pressure exposure were developed. Designs include the use of existing variable electrical components, such as potentiometers.

In one embodiment, a potentiometer is rotated by the change in shape of the shape memory material as a function of its exposure to either temperatures or water vapor pressures. This design can also be made with trimmer capacitors and/or variable inductors.

In a second embodiment, electrically conductive SMP is employed to vary the electrical conductivity of the SMP as it changes shape due to exposure to temperatures or water vapor pressure. Previous investigations of electrically conductive materials demonstrated large changes in resistance as rod shaped devices have been twisted.

In another embodiment, an inductor with an adjustable core is used to vary the electrical conductivity of the SMP. Mechanical motion from the SMP-sensing materials will be rectified into an appropriate force necessary to retract the core from inside an inductive coil. As the sensor is exposed to temperatures or water vapor pressure, the sensor material will retract the core from the inductor, changing the overall inductance of the device.

In another embodiment, two elastic electrodes as parallel plates and an elastomeric dielectric film are used. The entire capacitor is encased in SMP-sensor material. Once fabricated, the capacitor can be linearly strained to set the starting capacitance. As the sensor is exposed, it will change shape; the sensor will recover toward its unstrained memory shape and shift capacitance as a function of strain.

Integration of the current sensor technology with RFID technology will enable remote measurements of long-term, cumulative temperature and humidity exposure without requiring battery-operated data logging and memory used with current approaches. Tags developed with the combination of RFID and the current sensor technology will be able to cumulatively track heat and humidity exposure for 20 years or more without maintenance or risk of data loss. With this approach, the 5 and 10 year limitations of current RFID tags can be easily overcome because there is no memory or battery required.

Two notional approaches involving different classes of RFID systems are provided to demonstrate the flexibility associated with the sensing material. The first approach involves increasing or decreasing capacitance, resistance, and/or inductance as needed to effect a change in a L/C or R/C timing circuit. Timing circuits can be used to vary the transmission frequency of the tag with a slew of frequency indicating the overall cumulative exposure. In this case, motion would be converted into a change in resistance, capacitance, or inductance which will, in turn, result in a shift in the transmitted frequency.

Timing circuits can be used to clock a counter for a predetermined length of time. The output of the counter can be provided as a replacement for memory chips on current systems providing a digital number that represents the overall cumulative exposure. In this case, motion would be converted into a change in resistance, capacitance, or inductance which will, in turn, result in a shift in frequency and then be converted into a digital number. The digital number can be read and transmitted by a tag similar to an ID number being read from a memory component.

The second approach involves increasing or decreasing capacitance, resistance, and/or inductance as needed to effect a change in resonant frequency response.

The simplest case of RFID are 1 bit transponders which fall into four classes: radio frequency, microwave, frequency divider, and electromagnetic. The presence of a radio frequency tag is determined by a change in load of the reader's transmit circuit. The reader's transmit circuit can be designed to slew the output frequency over a specified frequency range while looking for a variation in load. Identification of a tag and corresponding frequency would provide adequate information to the reader pertaining to cumulative exposure. In this case, motion would be converted into change of resistance, capacitance, or inductance which would change the resonant frequency of the tag. Change in frequency would correspond to exposure levels sensed by the sensor material.

Final circuit selection will be based on feasibility and compatibility with system which will incorporate the present invention. Upon selection of circuit type in it will be obvious to those of skill in the art the methods and designs needed to optimize performance and overall size. Specifically, the circuit design should be developed to be compatible with sensor designs noted above and the RFID-based remote interrogation method used with the desired network.

What is claimed is:

1. A time temperature integration device comprising
    a temperature measurement means for continuously monitoring the temperature of the environment around a monitored product having a preferred storage temperature; and
    wherein said temperature measurement means is a shape memory material with a memory shape and a deformed shape; and
    wherein said shape memory material has a transition temperature range encompassing at least the preferred storage temperature of said monitored product and said shape memory material moves from said deformed shape to said memory shape in response to temperatures of the environment around said monitored product which abut or exceed the preferred storage temperature of said monitored product; and
    an indicator means for visually displaying the change in said shape memory material's shape connected to said shape memory material as said shape memory material moves from said deformed position to said memory position in response to said thermal energy absorbed by said device as it relates to the temperature of the environment around said device as indicative of the monitored product's fitness for use; and
    a shape memory polymer whose properties are adjusted so that a temperature integration device can be tailored to monitor a product without the use of an insulation or other housing.

2. The device of claim 1 wherein the means for visually displaying the change to said shape memory material's shape is a scale means attached to said shape memory material having calibrations thereon representing the cumulative amount of heat energy absorbed in and above said preferred storage temperature.

3. The device of claim 2 wherein said indicator means remains substantially in a position at which it was last moved by said shape memory material regardless of subsequent exposures of said shape memory material to temperatures lower than said preferred storage temperature.

4. The device of claim 1 wherein said shape memory material is a shape memory polymer.

5. The device of claim 1 wherein said shape memory polymer resin consists of a styrene shape memory polymer, cyanate ester shape memory polymer, maleimide shape memory polymer, epoxy shape memory polymer, vinyl ester shape memory polymer, or other shape memory polymer.

6. The device of claim 1 wherein said shape memory material is either a thermoset or thermoplastic resin.

7. The device of claim 1 wherein said shape memory material is a shape memory polymer composite composed of a fibrous material in a shape memory polymer resin matrix.

8. The device of claim 7 wherein said fibrous material is carbon nano-fibers, carbon fiber, spandex, chopped fiber, random fiber mat, fabric of any material, continuous fiber, fiberglass, or other type of textile fabric.

9. The device of claim 7 wherein said fibrous material is in flat weave, two-dimensional weave, or three-dimensional weave pattern.

10. The device of claim 7 wherein said shape memory polymer resin consists of a styrene shape memory polymer, cyanate ester shape memory polymer, maleimide shape memory polymer, epoxy shape memory polymer, vinyl ester shape memory polymer, or other shape memory polymer.

11. The device of claim 1 wherein said preferred storage temperature and transition temperature is about −20° Celsius to about 270° Celcius.

12. A time temperature integration device comprising
a means to attach said device to a monitored product having a preferred storage temperature; and
a temperature measurement means for continuously monitoring the temperature of the environment around said monitored product; and
wherein said temperature measurement means is a shape memory material and the physical, mechanical, or electrical properties of said shape memory material change in response to said temperature of the environment around said monitored product which abut or exceed the preferred storage temperature of said monitored product; and
an indicator means for visually displaying the change in said shape memory material's shape connected to said shape memory material as said shape memory material moves from said deformed position to said memory position in response to said thermal energy absorbed by said device as it relates to the temperature of the environment around said device as indicative of the monitored product's fitness for use; and
the shape memory material is a shape memory polymer whose properties are adjusted so that a temperature integration device can be tailored to monitor a product without the use of an insulation or other housing.

13. A time water-vapor pressure integration device comprising
a means to attached said device to a monitored product; and
a water vapor pressure measurement means for continuously monitoring the water vapor pressure of the environment around said monitored product; and
wherein said water vapor pressure measurement means is a shape memory material with a memory position and a deformed position and said shape memory material moves from said deformed position to said memory position in response to said water vapor pressure of the environment around said monitored product; and
means for visually displaying the change in the said shape memory material's shape as a function of cumulative amount of water absorbed by the shape memory material as it relates to the water vapor pressure of the environment around said monitored product as said shape memory material moves from said deformed position to said memory position as indicative of the monitored product's fitness for use; and
said shape memory material is a shape memory polymer whose properties are adjusted so that a vapor integration device can be tailored to monitor a product without the use of an insulation or other housing.

14. The device of claim 13 wherein the means for visually displaying the change to said shape memory material's shape is a scale means attached to said shape memory material having calibrations thereon representing the cumulative amount of heat energy absorbed in and above said preferred storage temperature.

15. The device of claim 14 wherein said indicator means remains substantially in a position at which it was last moved by said shape memory material regardless of subsequent exposures of said shape memory material to temperatures lower than said preferred storage temperature.

16. The device of claim 13 wherein said shape memory material is a shape memory polymer.

17. The device of claim 13 wherein said shape memory polymer resin consists of a styrene shape memory polymer, cyanate ester shape memory polymer, maleimide shape memory polymer, epoxy shape memory polymer, vinyl ester shape memory polymer, or other shape memory polymer.

18. The device of claim 13 where in said shape memory material is either a thermoset or thermoplastic resin.

19. The device of claim 13 wherein said shape memory material is a shape memory polymer composite composed of a fibrous material in a shape memory polymer resin matrix.

20. The device of claim 19 wherein said fibrous material is carbon nano-fibers, carbon fiber, spandex, chopped fiber, random fiber mat, fabric of any material, continuous fiber, fiberglass, or other type of textile fabric.

21. The device of claim 19 wherein said fibrous material is in flat weave, two dimensional weave, or three dimensional weave pattern.

22. The device of claim 19 wherein said shape memory polymer resin consists of a styrene shape memory polymer, cyanate ester shape memory polymer, maleimide shape memory polymer, epoxy shape memory polymer, vinyl ester shape memory polymer, or other shape memory polymer.

23. The device of claim 13 wherein said preferred storage temperature and transition temperature is about −20° Celsius to about 270° Celsius.

24. A time water-vapor pressure integration device comprising
a means to attached said device to a monitored product; and
a water vapor pressure measurement means for continuously monitoring the water vapor pressure of the environment around said monitored product; and
wherein said water vapor pressure measurement means is a shape memory material and the physical, mechanical, or electrical properties of said shape memory material change in response to said water vapor pressure of the environment around said monitored product; and means for visually displaying the change in said shape memory material's shape as a function of the cumulative amount of water absorbed by the shape memory material as it relates to the water vapor pressure of the environment around said monitored product as said shape memory material moves from said deformed position to said memory position as indicative of the monitored product's fitness for use; and said shape memory material is a shape memory polymer whose properties are adjusted so that a vapor integration device can be tailored to monitor a product without the use of an insulation or other housing.

* * * * *